United States Patent
Chakka et al.

(10) Patent No.: US 10,316,671 B2
(45) Date of Patent: Jun. 11, 2019

(54) GAS TURBINE ENGINE BLADE WITH VARIABLE DENSITY AND WIDE CHORD TIP

(71) Applicant: United Technologies Corporation, Hartford, CT (US)

(72) Inventors: Pitchaiah Vijay Chakka, Avon, CT (US); James D. Hill, Tolland, CT (US); David R. Pack, Gilbert, AZ (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 811 days.

(21) Appl. No.: 14/802,512

(22) Filed: Jul. 17, 2015

(65) Prior Publication Data

US 2016/0024935 A1    Jan. 28, 2016

Related U.S. Application Data

(60) Provisional application No. 62/028,476, filed on Jul. 24, 2014.

(51) Int. Cl.
| | |
|---|---|
| *F01D 5/18* | (2006.01) |
| *F01D 5/14* | (2006.01) |
| *F01D 5/28* | (2006.01) |

(52) U.S. Cl.
CPC ............... *F01D 5/18* (2013.01); *F01D 5/141* (2013.01); *F01D 5/147* (2013.01); *F01D 5/28* (2013.01); *F05D 2230/211* (2013.01); *F05D 2300/1723* (2013.01); *Y02T 50/673* (2013.01)

(58) Field of Classification Search
CPC . F01D 5/18; F01D 5/141; F01D 5/147; F01D 5/28
See application file for complete search history.

(56) References Cited

U.S. PATENT DOCUMENTS

| | | | |
|---|---|---|---|
| 4,431,376 | A | 2/1984 | Lebenstein et al. |
| 5,931,641 | A | 8/1999 | Finn et al. |
| 6,887,042 | B2 * | 5/2005 | Ito ................ F01D 5/141 |
| | | | 415/208.2 |

(Continued)

FOREIGN PATENT DOCUMENTS

| | | |
|---|---|---|
| EP | 1225303 | 7/2002 |
| EP | 1657401 | 5/2006 |

(Continued)

OTHER PUBLICATIONS

Extracted Singapore Search Report for Singapore Patent No. 10201505408W dated May 30, 2016.

(Continued)

*Primary Examiner* — David E Sosnowski
*Assistant Examiner* — Cameron A Corday
(74) *Attorney, Agent, or Firm* — Carlson, Gaskey & Olds, P.C.

(57) ABSTRACT

A blade for a gas turbine engine includes a body that includes an airfoil that extends in a radial direction from a 0% span position near an airfoil base to a 100% span position at an airfoil tip. The airfoil includes a first portion near the airfoil base with a first density and includes a second portion near the airfoil tip with a second density. The second density is less than the first density. The second portion includes an increasing true chord length in the radial direction.

11 Claims, 4 Drawing Sheets

(56) References Cited

U.S. PATENT DOCUMENTS

| | | | |
|---|---|---|---|
| 2005/0089403 A1 | 4/2005 | Ito et al. | |
| 2010/0135812 A1* | 6/2010 | Cairo | B23P 6/005 416/223 A |
| 2010/0284801 A1 | 11/2010 | Greim et al. | |

FOREIGN PATENT DOCUMENTS

| | | |
|---|---|---|
| WO | 2007042522 | 4/2007 |
| WO | 2014092922 | 6/2014 |
| WO | 2014093826 | 6/2014 |
| WO | 2014098961 | 6/2014 |

OTHER PUBLICATIONS

U.S. Appl. No. 14/106,007, filed Dec. 13, 2013 titled Hybrid Turbine Blade for Improved Engine Performance or Architecture.
The Extended European Search Report for EP Application No. 15177509.5, dated Apr. 12, 2016.

* cited by examiner

GAS TURBINE ENGINE BLADE WITH VARIABLE DENSITY AND WIDE CHORD TIP

CROSS-REFERENCE TO RELATED APPLICATIONS

This application claims priority to U.S. Provisional Application No. 62/028,476, which was filed on Jul. 24, 2014 and is incorporated herein by reference.

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND

A gas turbine engine typically includes a fan section, a compressor section, a combustor section and a turbine section. Air entering the compressor section is compressed and delivered into the combustor section where it is mixed with fuel and ignited to generate a high-temperature and high pressure exhaust gas flow. The high-temperature and high pressure exhaust gas flow expands through the turbine section to drive the compressor and the fan section. The compressor section typically includes low and high pressure compressors, and the turbine section includes low and high pressure turbines.

An airfoil has a true and axial chord that extends from the leading edge to the trailing edge. A typical turbine blade has an airfoil that generally uniformly tapers from the platform toward the tip such that the axial chord of the airfoil steadily decreases along the radial direction toward the tip.

SUMMARY

In one exemplary embodiment, a blade for a gas turbine engine includes a body that includes an airfoil that extends in a radial direction from a 0% span position near an airfoil base to a 100% span position at an airfoil tip. The airfoil includes a first portion near the airfoil base with a first density and includes a second portion near the airfoil tip with a second density. The second density is less than the first density. The second portion includes an increasing true chord length in the radial direction.

In a further embodiment of the above, the second portion is in the range of 90% span to 100% span.

In a further embodiment of any of the above, the airfoil has a leading and a trailing edge that define the true chord length. The leading edge provides a leading edge axial position and the trailing provides a trailing edge axial position.

In a further embodiment of any of the above, the leading edge axial position is less positive as a span position in the radial direction increases along the second portion.

In a further embodiment of any of the above, the trailing edge axial position is more positive as a span position in the radial direction increases along the second portion.

In a further embodiment of any of the above, the leading edge axial position is less positive as a span position in the radial direction increases along the second portion, and the trailing edge axial position is more positive as a span position in the radial direction increases along the second portion.

In a further embodiment of any of the above, the airfoil is necked at a midspan region.

In a further embodiment of any of the above, the airfoil base includes a platform.

In a further embodiment of any of the above, the first portion includes a first material that provides the first density. The second portion includes a second material that provides the second density and that differs from the first material in composition. The first and second portions are metallurgically bonded to each other in a boundary zone and have a mixture of the first material and the second material.

In another exemplary embodiment, an array of blades for a gas turbine engine includes multiple blades that are circumferentially spaced from one another. Each blade includes a body. The body includes an airfoil that extends in a radial direction from a 0% span position near an airfoil base to a 100% span position at an airfoil tip. The airfoil includes a first portion near the airfoil base with a first density, and the airfoil includes a second portion near the airfoil tip with a second density. The second density is less than the first density, and the second portion includes an increasing true chord length in the radial direction.

In a further embodiment of the above, the second portion is in the range of 90% span to 100% span.

In a further embodiment of any of the above, the airfoil has a leading and a trailing edge that define the true chord length. The leading edge provides a leading edge axial position and the trailing provides a trailing edge axial position.

In a further embodiment of any of the above, the leading edge axial position is less positive as a span position in the radial direction increases along the second portion.

In a further embodiment of any of the above, the trailing edge axial position is more positive as a span position in the radial direction increases along the second portion.

In a further embodiment of any of the above, the leading edge axial position is less positive as a span position in the radial direction increases along the second portion, and the trailing edge axial position is more positive as a span position in the radial direction increases along the second portion.

In a further embodiment of any of the above, the airfoil is necked at a midspan region.

In a further embodiment of any of the above, the airfoil base includes a platform.

In a further embodiment of any of the above, the first portion includes a first material that provides the first density. The second portion includes a second material that provides the second density and that differs from the first material in composition. The first and second portions are metallurgically bonded to each other in a boundary zone and have a mixture of the first material and the second material.

In a further embodiment of any of the above, the array includes turbine blades that each have a cooling passage.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
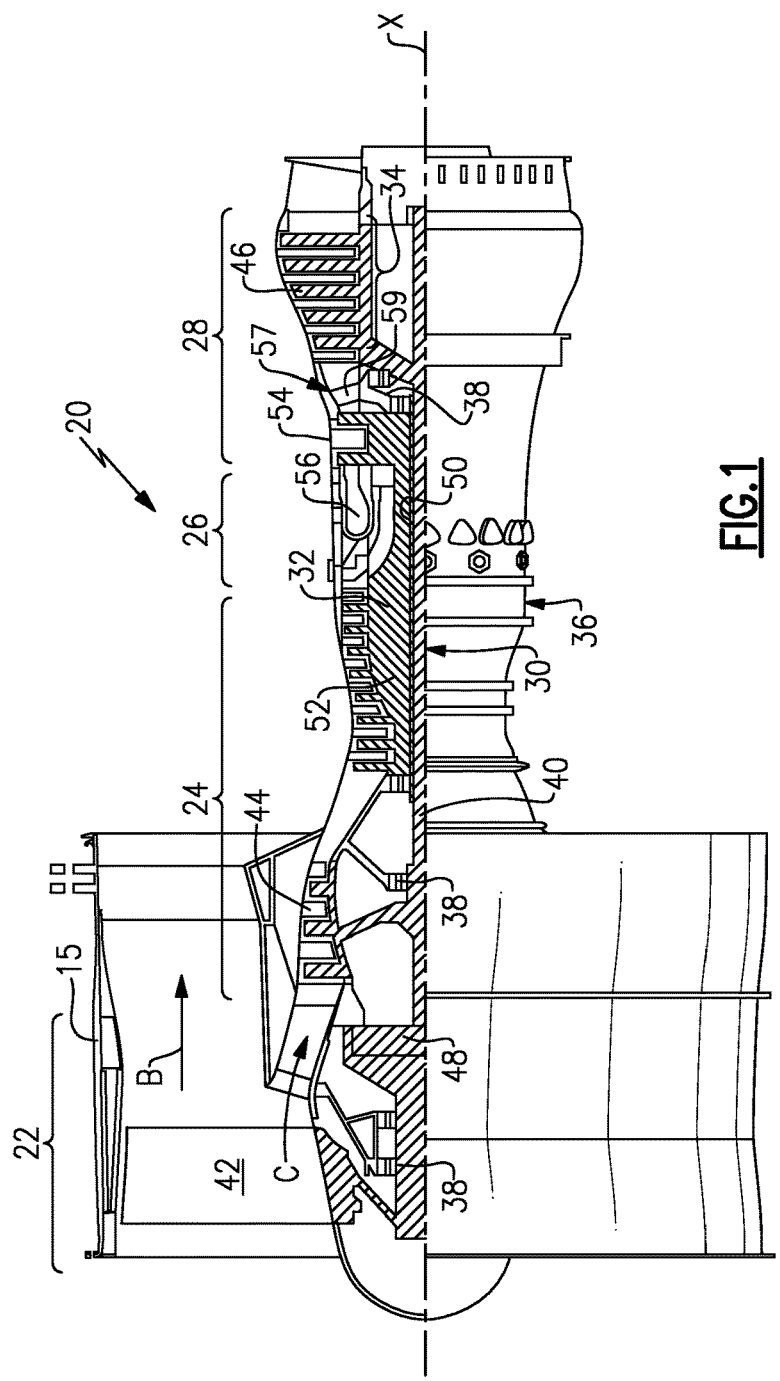
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Although geared architecture is described here, the disclosed airfoil is applicable to any engine with our without a geared architecture.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
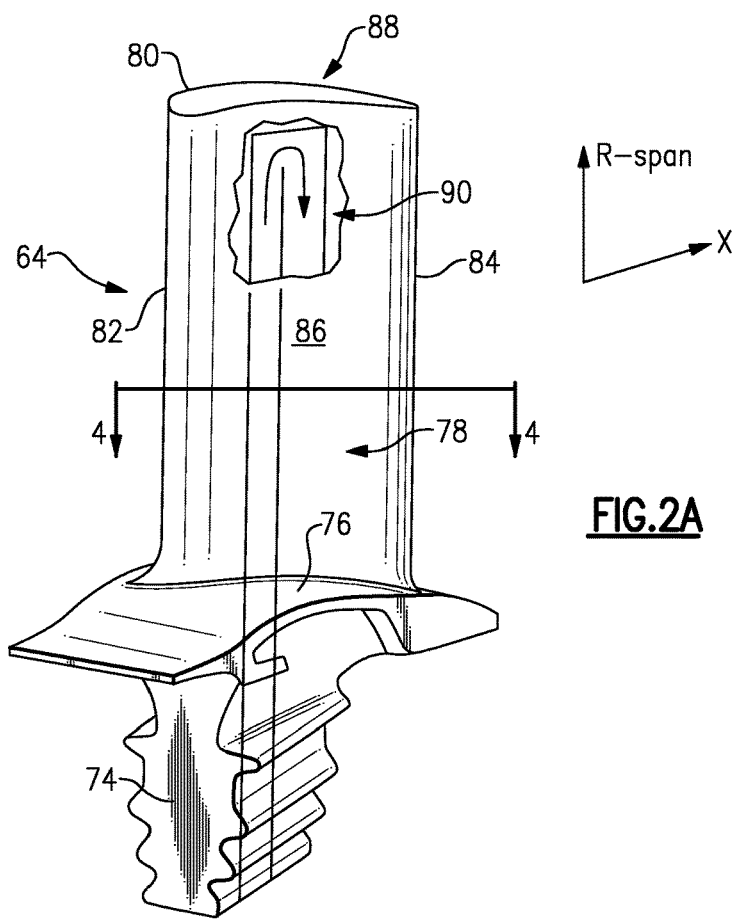
FIG. 2A schematically illustrates a gas turbine engine blade, according to an embodiment.
Figure 2B:
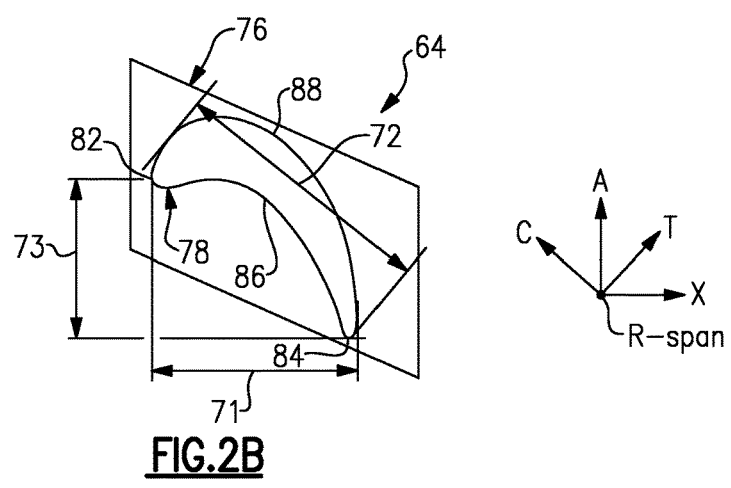
FIG. 2B is a plan view of the blade illustrating directional references, according to an embodiment.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Figure 3:
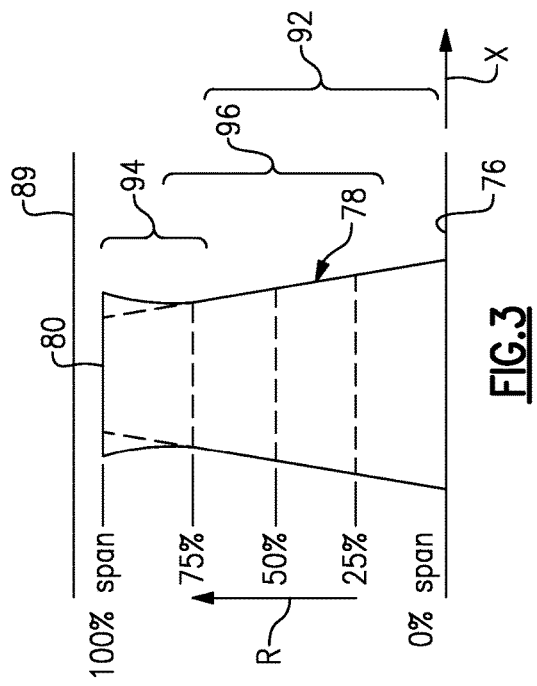
FIG. 3 is a schematic view of the disclosed blade with a variable density, according to an embodiment.

The turbine blade 64 may be fabricated of superalloy materials, such as cobalt- or nickel-based alloys. Referring to FIG. 3, the airfoil 78 has a first portion 92 near an airfoil base fabricated of a first material. In the example, the airfoil base is the platform 76, although the airfoil base may be a root of a platformless blade. The airfoil 78 also includes a second portion 94 near the tip 80 (proximate to a blade outer air seal 89) fabricated of a second, different material. For example, the first and second materials differ in at least one of composition, microstructure and mechanical properties. In a further example, the first and second materials differ in at least density.

In one example, the first material (near the base portion of the blade 64) has a relatively higher density and the second material (near the tip 80) has a relatively lower density. In this manner, the pull forces at the tip may be reduced, which enables more material to be used at the tip without requiring additional material near the base of the airfoil for structural integrity of the blade. The first and second materials can additionally differ in other characteristics, such as corrosion resistance, strength, creep resistance, fatigue resistance, or the like.

Although first and second portions are discussed, the airfoil may include more than two portions. Moreover, the portions may not be discrete. Instead, the first and second portions are metallurgically bonded to each other in a boundary zone having a mixture of the first material and the second material. In this manner, the material composition transitions between the portions.

Figure 5:
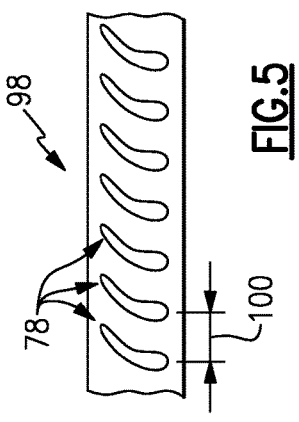
FIG. 5 depicts a partial array of blades, according to an embodiment.

Referring to FIG. 5, an array 98 of blade airfoils 78 are shown circumferentially spaced apart from one another a gap 100. Each airfoil 78 extends in the radial direction R from a 0% span position near the airfoil base to a 100% span position at the tip 80, as best shown in FIG. 3.

In one embodiment, the first portion 92 may extend from the 0% span position to the 70% span position, and the second portion 94 may extend from the 70% span position to the 100% span position. In another embodiment, the second portion is in the range of 90% span to 100% span.

A midspan region 96 may extend from the 20% span position to the 80% span position, overlapping the first and second portions 92, 94. In an embodiment, the disclosed airfoil 78 may have an hourglass-like shape such that the midspan region is necked. In particular, the second portion 94 has increasing axial and/or true chord lengths 71, 72, which is the length from the leading edge 82 to the trailing edge 84, in the axial and chord-wise direction x, c, respectively. In addition to increasing axial chord at the tip, the tip true chord is also increased by increasing the height 73 of the leading edge airfoil section, as shown in FIG. 2B.

Figure 4:
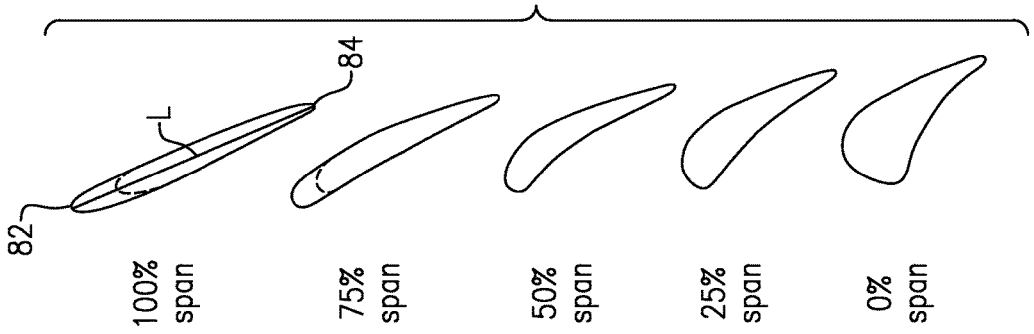
FIG. 4 illustrates various cross-sections through the blade of FIG. 3 at various span positions as compared to a conventional blade, according to an embodiment.

The airfoil 78 is illustrated in FIG. 3 as flaring outwardly in the chordwise direction C at both the leading and trailing edges 82, 84. However, if desired, either the leading edge position (shown in FIG. 4) or the trailing edge position may be varied to increase the chord near the tip 80.

The leading and trailing edges 82, 84 respectively include a leading edge axial position and a trailing edge axial position. In one coordinate measurement convention, the positive axial direction corresponds to the flow direction through the engine 20. Thus, if the leading edge flares outward in the chord-wise direction, the leading edge axial position is less positive as a span position in the radial direction increases along the second portion 94. If the trailing edge flares outward in the chord-wise direction, the trailing edge axial position is more positive as a span position in the radial direction increases along the second portion 94.

Any suitable process may be used to provide the disclosed variable density airfoil. One example manufacturing method is set forth in U.S. patent application Ser. No. 14/106,007 entitled "Hybrid Turbine Blade for Improved Engine Performance or Architecture," filed Dec. 13, 2013, which is incorporated by reference in its entirety.

In one example, the blade 64 is fabricated using a casting process. For example, the casting process can be an investment casting process that is used to cast a single crystal microstructure (with no high angle boundaries), a directional (columnar grain) microstructure, or an equiaxed microstructure. In one example of fabricating the blade 64 by casting, the casting process introduces two, or more, alloys that correspond to the first and second (or more) materials. For example, the alloys are poured into an investment casting mold at different stages in the cooling cycle to form the first and second portions 92, 94 of the blade 64. The following example is based on a directionally solidified, single crystal casting technique to fabricate a nickel-based blade, but can also be applied to other casting techniques, and other material compositions.

At least two nickel-based alloys of different composition (and different density upon cooling) are poured into an investment casting mold at different stages of the withdrawal and solidification process of the casting.

Figure 6:
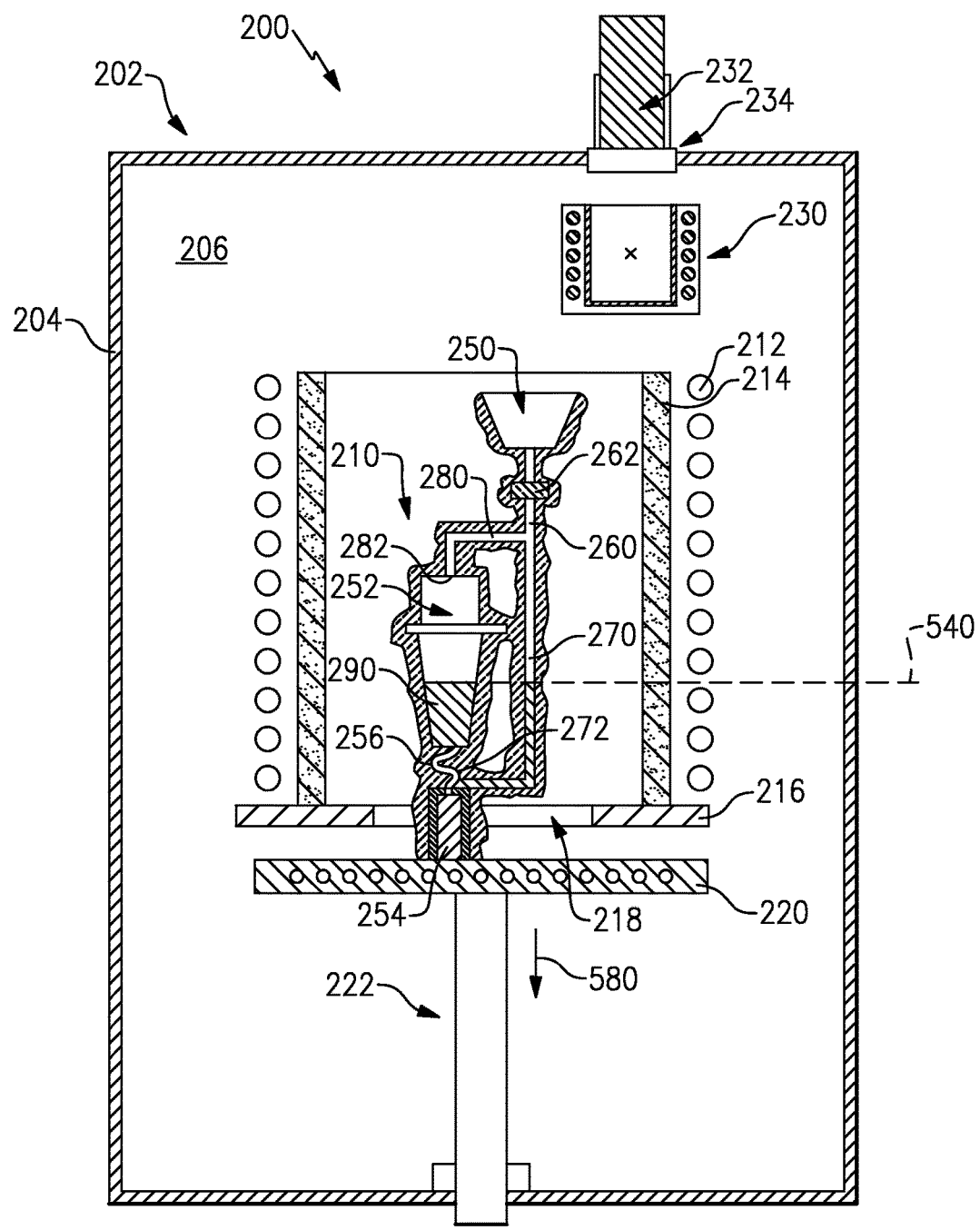
FIG. 6 is a schematic view of an example casting apparatus for producing variable density blades, according to an embodiment.

A tip-upward or tip-downward casting technique may be used, for example. In a tip-downward casting, shown schematically in FIG. 6, a low density alloy will be poured just sufficient to fill the outboard portion, and withdrawal process begins. As the transition location in the cavity approaches the baffle, a different alloy with higher creep strength is poured to fill the rest of the mold. This may be achieved by adding ingot(s) of the heavier alloy in the melt crucible and pouring the molten heavier alloy into the pour cup.

A baseline casting system 200 comprises a furnace 202 which includes a vacuum chamber 204 having an interior 206. For heating a mold or shell 210, the furnace includes an induction coil 212 surrounding a susceptor 214.

A baffle 216 is positioned at the bottom of the susceptor and has a central opening or aperture 218 for downwardly passing the shell 210 as it is withdrawn from a heating zone defined by the coil and susceptor and allowed to cool as it passes below the baffle. The shell is supported atop a chill plate 220 (e.g., water cooled) which is held by an elevator or actuator 222 to vertically move the chill plate (e.g., descend in a downward direction 580).

A melt crucible 230 receives melted metallic ingots 232. The ingots may be introduced through an air lock 234 and deposited into the crucible for melting. The crucible may have an actuator (not shown) for pouring the alloy into a pour cup 250 of the shell.

The exemplary shell is for casting a blade in a tip downward condition and has an internal cavity 252 generally corresponding to features of such blade. At a lower end of the shell, the shell includes a starter seed 254. A spiral starter passageway (helical grain starter) 256 extends upward to the cavity.

For introducing alloy to the cavity 252, a downsprue or feeder 260 extends downwardly from a base of the cup. The exemplary downsprue 260 contains an inline filter 262. In an embodiment, a modification may be made that involves splitting the downsprue or feeder into two branches for respectively introducing two pours of two different alloys. The downsprue includes a first branch which may provide a bottom fill and may comprise a conduit 270 having an outlet port 272 relatively low on the shell. The exemplary port 272 is below the desired transition 540 and, more particularly, below the lowest end of the part to be cast. The exemplary outlet may be positioned to direct flow to the seed (if any) 254 and helical grain starter 256 so that the flowpath passes downward through this branch and upward through the grain starter to a port at the mold cavity where the blade is molded (e.g., at the tip). In this embodiment, however, a second branch 280 branches off the downsprue downstream of the filter. The second branch provides a top fill flowpath to a port 282 relatively high on the shell. The exemplary port 282 is at a top of the mold cavity (e.g., at the inner diameter (ID) end of the root). As is discussed further below, withdrawal may be synchronized so that a first pour of one alloy may pass through the first branch (and optionally or preferably not the second branch) to provide a desired amount of a first alloy in a tip inward region. Thereafter, a second pour of a second alloy may be applied to the same pour cup. However, the second pour will find the first branch blocked because, along at least a portion of the first flowpath, by the metal 290 of the first pour which will have solidified to block further communication. Accordingly, the second pour or shot will pass as a top fill through the second port. This top fill does not block further pours until the cavity is full. Accordingly, the second pour may terminate before the cavity is filled and a third pour (through the second port) may similarly fill a remainder of the cavity to create three zones of differing composition. In various embodiments, this process might be extended to allow additional pours.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A blade for a gas turbine engine comprising:
a body including an airfoil extending in a radial direction from a 0% span position near an airfoil base to a 100% span position at an airfoil tip, the airfoil includes a first portion near the airfoil base with a first density, and includes a second portion near the airfoil tip with a second density, the second density is less than the first density, the second portion including an increasing true chord length in the radial direction, wherein the second portion is only in the range of 90% span to 100% span.

2. The blade according to claim 1, wherein the airfoil has a leading and a trailing edge defining the true chord length, the leading edge provides a leading edge axial position, and the trailing edge provides a trailing edge axial position.

3. The blade according to claim 1, wherein the airfoil is necked at a midspan region.

4. The blade according to claim 1, wherein the airfoil base includes a platform.

5. The blade according to claim 1, wherein the first portion includes a first material that provides the first density, and the second portion includes a second material that provides the second density and that differs from the first material in composition, the first and second portions are metallurgically bonded to each other in a boundary zone having a mixture of the first material and the second material.

6. An array of blades for a gas turbine engine comprising:
multiple blades circumferentially spaced from one another, each blade includes a body, the body including an airfoil extending in a radial direction from a 0% span position near an airfoil base to a 100% span position at an airfoil tip, the airfoil includes a first portion near the airfoil base with a first density, and the airfoil includes a second portion near the airfoil tip with a second density, the second density is less than the first density, and the second portion includes an increasing true chord length in the radial direction, wherein the second portion is only in the range of 90% span to 100% span.

7. The array according to claim 6, wherein the airfoil has a leading and a trailing edge defining the true chord length, the leading edge provides a leading edge axial position, and the trailing provides a trailing edge axial position.

8. The array according to claim 6, wherein the airfoil is necked at a midspan region.

9. The array according to claim 6, wherein the airfoil base includes a platform.

10. The array according to claim 6, wherein the first portion includes a first material that provides the first density, and the second portion includes a second material that provides the second density and that differs from the first material in composition, the first and second portions are metallurgically bonded to each other in a boundary zone having a mixture of the first material and the second material.

11. The array according to claim 6, wherein the array includes turbine blades each having a cooling passage.

* * * * *